United States Patent

Wolf

[15] 3,693,281
[45] Sept. 26, 1972

[54] PEEK IN MODEL KIT

[72] Inventor: Tobin Wolf, 447 Essex Avenue, Bloomfield, N.J. 07003

[22] Filed: Jan. 15, 1971

[21] Appl. No.: 106,761

[52] U.S. Cl. ................................. 46/228, 46/1 H
[51] Int. Cl. .................................. A63h 33/26
[58] Field of Search ........ 46/1, 228, 74, 76; 350/4, 5; 352/129

[56] References Cited

UNITED STATES PATENTS

| | | | |
|---|---|---|---|
| 3,131,593 | 5/1964 | Grow | 350/4 |
| 2,511,334 | 6/1950 | Gruber | 352/129 X |
| 2,615,336 | 10/1952 | Rothweiler | 352/129 |
| 3,306,697 | 2/1967 | Nemeth | 352/129 |
| 3,000,138 | 9/1961 | Tagliaferri | 46/228 X |
| 3,090,158 | 5/1963 | Dixon | 46/228 |

FOREIGN PATENTS OR APPLICATIONS 633,279    12/1961    Canada ....................... 350/5

Primary Examiner—Louis G. Mancene
Assistant Examiner—D. L. Weinhold
Attorney—Jay M. Cantor

[57] ABSTRACT

The disclosure relates to a model kit which consists generally of premolded parts, such as plastic or the like which can be preassembled in well known manner to provide a resulting scale mode of considerable accuracy and detail of the external part of the original structure being copied. The disclosure also includes at least one photo-optical system which is positioned at strategic locations in the model upon assembly beneath a peep hole wherein a peep hole is provided going into the interior of the assembled model, the photo-optical system including a lens and a photograph or the like capable of being seen through the peep hole to provide an indication of what would normally be positioned within the original structure when viewing at the location of the peep hole.

7 Claims, 3 Drawing Figures

PATENTED SEP 26 1972 3,693,281

Inventor
TOBIN WOLF

By: Jay M Cantor

PEEK IN MODEL KIT

This invention relates to hobby or model kits in general, and, more specifically, it relates to hobby or model kits wherein a photo-optical system can be positioned at strategic locations in the completed model whereby a peep hole is provided on the model surface over the photo-optical system for indicating the contents that would be at the interior of the completed model in the original structure being copied.

Hobby and model kits have been well known in the art and many types thereof are presently available. While model kits of this type provide a great deal of accuracy and detail in their external surfaces, the prior art has not provided such models wherein an extra dimension can be added whereby one can actually observe conditions at the interior of the model in the most minute details with the possibility of varying these conditions.

In accordance with the present invention, there is provided a hobby or model kit, the kit including a photo-optical system which can be introduced into the completed model in the form of a peep hole whereby an observer can view through the peep hole to determine and observe the contents of the interior of the model when viewing at the location of the peep hole. The photo-optical system produces a new dimension of excitement, authenticity and realism to the well known prior art hobby kits.

It is therefore an object of this invention to provide a hobby or model kit capable of providing a substantially real life reproduction of a model interior.

It is a still further object of this invention to provide a hobby or model kit capable of providing greater realism with respect to actual real life versions thereof.

It is a still further object of this invention to provide a photo-optical system incorporated in a hobby or model kit for enabling viewing into the interior of the model upon completion with actual real life conditions therein.

The above objects and still further objects of the invention will immediately become apparent to those skilled in the art after consideration of the following preferred embodiment thereof which is provided by way of example and not by way of limitation, wherein.

Figures 1, 2, 3:
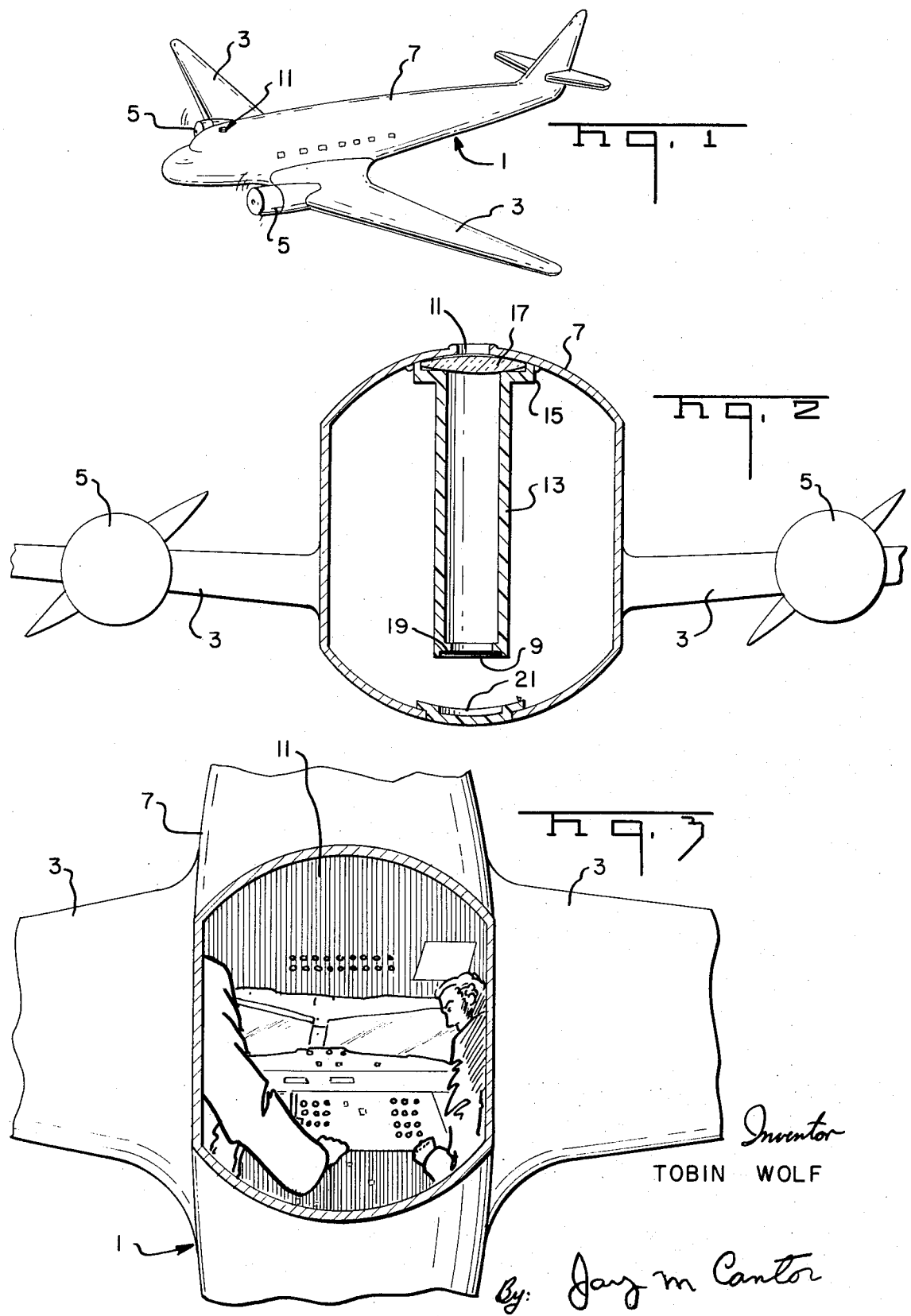
FIG. 1 is a view in elevation of an assembled model kit of an airplane in accordance with the present invention.
FIG. 2 is a cross-section through the fuselage of the model of FIG. 1 showing the photo-optical system therein in accordance with the present invention.
FIG. 3 is a top view of a portion of the fuselage of FIG. 2 showing the apparent view seen through the peep hole in enlarged form.

Referring first to FIG. 1, there is shown a completed or assembled model kit of an airplane 1. The airplane includes front wings 3, motors 5 and a hollow fuselage 7. A peep hole 11 is shown at the top portion of the fuselage 7 as will be explained in more detail hereinbelow. It should be understood that a plurality of peep holes 11 can be provided at various locations of the model or, alternatively, a single peep hole can be provided as shown, but located at a different position.

Referring now to FIG. 2, there is shown a cross-section through a portion of the fuselage 7 of FIG. 1, including a portion of the wings 3 and motor structure 5. In addition, the peep hole 11 is shown in the form of an aperture at the top portion of the fuselage 7. A tubular holder 13, which is hollow at its interior, is positioned within the fuselage 7, a portion of the holder 13 having an upwardly extending rib 15 around one end thereof for the purpose of locating the holder 13 in proper relation with the aperture of peep hole 11. A lens 17 is positioned within the rib, over the hollow portion of the holder 13 and below the peep hole 11. At the bottom portion of the holder 13 is a film 9, the film 9 either being fixedly locked at its position at the base of the holder 13 or being changeable, as desired, to be able to provide changes at the interior of the model upon viewing. The tubular holder 13 is cemented or snapped in place to the upper portion of the fuselage 7 beneath the peep hole 11, thereby locking the lens 17 between the ribs 15, the holder 13 and the fuselage 7.

The film 9 is positioned within a pair of recesses or grooves 19 at the opposite end of the tube 13, the film being retained therein by a small dab of cement along its edges or by cutting the film slightly larger than the recess, thereby necessitating that it be pressed into the confines of the recess. In this manner, the entire optical system may be easily assembled with no more skill than is required to assemble the model itself. A translucent or frosted screen 21 is provided to permit the entry of diffused ambient light, the screen being secured axially with the tube 13 at the bottom portion of the fuselage 7. Though a translucent or frosted screen is disclosed for the purpose of allowing light to pass therethrough and through the film 9 to the lens 17 and the peep hole 11, it should be understood that a self-contained lighting system can be used in place thereof within the fuselage. This could be exemplified by a flashlight bulb and batteries with an appropriate switch at the outside of the fuselage. In addition, a flap or the like could be added at the base of the fuselage to permit entry to the interior of the fuselage of changing of the film 9.

With reference to FIG. 3, there is shown a top view of the wings 3 and the fuselage 7 of the airplane of FIG. 1 with the peep hole 11 appearing enlarged with reproduction of the contents of the film 9 therein as it would appear to the observer under normal circumstances when viewing same through the peep hole and photo-optical system. It can be seen that an observer, by looking through the aperture 11, in the specific embodiment disclosed herein, will note the cabin of the aircraft with the instrument panel, pilot, co-pilot and cabin interior.

It should be understood that, though the subject invention has been described with respect to an airplane, the invention herein is of broader scope and can be used in any type of model, such as an automobile, train, space ship and the like, but not limited thereto.

Though the invention has been described with respect to a specific preferred embodiment thereof, many variations and modifications thereof will immediately become apparent to those skilled in the art. It is therefore the intention that the appended claims be interpreted as broadly as possible in view of the prior art to include all such variations and modifications.

What is claimed is:

1. A model kit which comprises a plurality of parts assemblable into a model, at least one of said parts having an exterior surface defining a hollow interior region and, a pair of apertures in said exterior surface, said apertures lying at the extremities of a center line extending entirely through said hollow interior region, and means attachable to said one of said parts and substantially coaxial with said center line for providing an image, said means includes a lens positionable adjacent one of said apertures, an image bearing member positioned coaxially with said apertures and second means to illuminate said image bearing member.

2. A model kit as set forth in claim 1 wherein said second means is a frosted glass positionable substantially coaxial with said aperture.

3. A model kit which comprises an assembled model having a surface and hollow interior region, an aperture formed in said surface and optical means positioned in said hollow interior region coaxial with said aperture for projecting an image at said aperture, wherein said optical means includes a lens positioned adjacent said aperture and substantially coaxial therewith, image bearing means positioned substantially coaxial with said lens and said aperture opposite the aperture side of said lens and means to project light on said image bearing means.

4. A model kit as set forth in claim 3 wherein said means to project light includes frosted glass extending through said surface and substantially coaxial with said lens and image bearing means.

5. A model kit as set forth in claim 3 wherein said means to project light includes a bulb positioned within said hollow interior region and substantially coaxial with said lens and image bearing means.

6. A model kit as set forth in claim 4 wherein said image bearing means is a film.

7. A model kit as set forth in claim 3 wherein said optical means includes means for functionally securing said image bearing means therein.

* * * * *